US008107482B2

(12) United States Patent
Minkenberg et al.

(10) Patent No.: US 8,107,482 B2
(45) Date of Patent: Jan. 31, 2012

(54) MULTIPATH DISCOVERY IN SWITCHED ETHERNET NETWORKS

(75) Inventors: Cyriel Minkenberg, Ruschlikon (CH); Mircea R. Gusat, Ruschlikon (CH)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 12/537,677

(22) Filed: Aug. 7, 2009

(65) Prior Publication Data

US 2011/0032825 A1 Feb. 10, 2011

(51) Int. Cl.
H04L 12/28 (2006.01)
(52) U.S. Cl. .................................. 370/395.31
(58) Field of Classification Search ............. 370/395.31, 370/351, 389, 238, 422
See application file for complete search history.

(56) References Cited

U.S. PATENT DOCUMENTS

| 6,301,256 | B1 * | 10/2001 | Vasa ............................. 370/401 |
| 7,522,538 | B2 * | 4/2009 | Rhim et al. .................... 370/254 |
| 2008/0080543 | A1 | 4/2008 | Hickox et al. | |

OTHER PUBLICATIONS

Ko, Michael, et al., "A Case for Convergence Enhanced Ethernet: Requirements and Applications", IEEE Communications Society, 2008 IEEE.
Finn, Norman, Cisco Systems; "Multiple Scanning Trees in 802.1Q", IEEE 802.1, Sep. 26, 1996.

* cited by examiner

*Primary Examiner* — Kwang B Yao
*Assistant Examiner* — Anh Ngoc Nguyen
(74) *Attorney, Agent, or Firm* — Scully, Scott, Murphy & Presser, P.C.; Daniel P. Morris, Esq.

(57) ABSTRACT

A network switch device receives a communication packet having a source MAC address s and a destination MAC address d at a switch port p. Then, the network switch device determines whether a valid routing table entry (s, p) exists, there by indicating that the source MAC address s is reachable via a switch port p. The network switch device further determines for the destination MAC address d whether there is at least one switch port q for which a valid routing table entry (d, q) exists, there by indicating that d is reachable via a switch port q. When the routing table entries (s, p) and (d, q) exist, the network switch device routes the communication packet to the switch port q.

16 Claims, 5 Drawing Sheets

MULTIPATH DISCOVERY IN SWITCHED ETHERNET NETWORKS

BACKGROUND

This invention relates generally to network communications and, more particularly, to routing a communication packet through a network switch device.

Ethernet networks typically do not require explicit programming of routing tables in a network switch device. A network switch device automatically learns routing by observing Media Access Control (MAC) addresses of communication packets (i.e., Ethernet frames) entering to the network switch device. MAC address is a quasi-unique identifier or physical address assigned to network adapters or network interface cards, e.g., by their manufactures. If a communication packet from a MAC address x enters at switch port y, the switch device makes an entry in its routing table to route the packet destined to the address x through the port y. When a communication packet arrives for which no entry exists in the routing table, the switch device broadcasts the packet to all ports except the port at which the packet arrived. Thus, each network switch device discovers a route to each end node (e.g., a computing device that an end user uses), assuming that all end nodes generate some packets that reach the switch device.

However, this broadcasting mechanism does not work with a network that has a loop because the broadcast mechanism can cause "broadcast storms" of communication packets being replicated in the loop ad infinitum. Thus, Ethernet networks traditionally have a tree structure to prevent the loop. The broadcast storm refers to a state in which a communication packet that has been broadcast across a network results in even more responses, and each response results in still more responses. A broadcast storm can block all other network traffic.

To avoid loops in a network, traditional solutions employ a spanning tree protocol that must execute on the network to determine which switch ports may be used and which ports should be disabled, transforming a physical topology of the network (which may include loops) into a logical topology without loops. However, employing the spanning tree protocol can negate multi-path routing capabilities of the network. Multi-path routing refers to a routing technique where forwarding a communication packet to a single destination address can occur over multiple paths, which can yield a variety of benefits such as a fault tolerance, an increased bandwidth, or an improved security. The spanning tree protocol (STP) refers to a network protocol that guarantees a loop-free topology in a Local Area Network (LAN). The STP allows a network to include spare (redundant) links to provide automatic backup paths if an active link fails, without creating a loop or a need for manual enabling/disabling of these backup links. The STP is defined in IEEE standard 802.1D.

Any network with bidirectional links and multi-path routing capabilities from a source node to a destination node automatically has a loop in it. Hence, broadcasting a communication packet to discover a route can cause broadcast storms in the network having multi-path routing capabilities. Convergence Enhanced Ethernet networks often have multi-path routing capabilities. The Convergence Enhanced Ethernet refers to an enhanced Ethernet that enables convergence of various applications in data centers onto a single interconnect technology. Ko et al., "A Case for Convergence Enhanced Ethernet: Requirements and Applications", IEEE International Conference on Communications, 2008 (ICC 2008), 19-23 May 2008 Page(s):5702-5707, wholly incorporated by reference as set forth herein, describes the Convergence Enhanced Ethernet in detail.

Some traditional solutions employ a multiple spanning tree (MST) protocol within a network. IEEE standard 802.1Q, which is supported by most Ethernet hardware, specifies an operation of virtual local area network (VLAN) bridges, which support VLAN operation within an IEEE 802 bridged LAN. The MST protocol (IEEE standard 802.1s) adds facility for VLAN bridges to use multiple spanning trees, providing communication packet(s) belonging to different VLANs to flow over potentially different paths within the virtual bridged LAN. According to the MST protocol, by defining multiple VLANs, each of which having its own spanning tree, it is possible to provide multiple paths between any pair of source and destination nodes. However, each spanning tree provides exactly one path between a source node and a destination node. Thus, each alternative path requires an additional VLAN.

However, the traditional solutions employing the MST protocol may have limited scalability and reduction of VLAN address space. Currently, the VLAN identifier comprises 12 bits, allowing for up to 4,096 VLANs. This implies that, in principle, each switch device can maintain up to 4,096 different routing tables, one per VLAN. On the other hand, a total number of alternative paths is also limited to 4,096. However, many topologies have an arbitrarily large number (e.g., $>10^{12}$) of possible paths between two end nodes, although the alternative paths are usually constrained to loop-free paths. For example, in a 2D n×n mesh network, there are $(2\times(n-1))!/((n-1)!\times(n-1)!)$ shortest paths between nodes at opposite corners of the mesh. Specifically, when there are 11 nodes (i.e., n=11) in the 2D n×n mesh network, there are 184,756 paths. When there are 21 nodes in the network, there are 137,846,528,820 paths.

Fat tree network is a universal network configured for efficient communication. Links in a fat tree network become fatter as one moves up the tree toward a root of the tree. By choosing fatness of the links, the network can be tailored to efficiently use bandwidth made available or overcome bottlenecks in the network. The fat tree network provides the number of alternative shortest paths according to the number of switches in a top level of the tree. For example, in a 3-level fat tree built out of 32-port switches (i.e., a fat tree network having 8,192 nodes (32×16×16=8,192) and 1,280 switches (512+512+256=1,280 switches)), there are up to 256 paths per pair of end nodes. In this example, one spanning tree may be rooted on each top-level switch.

Thus, it is highly desirable to provide a network switching method and system that allow self-learning (e.g., discovering routes by broadcasting a packet) of a routing table in a network with multi-path capabilities without causing broadcast storm and without requiring implementation of the STP, MST protocol and without manual route configuration.

SUMMARY

The present invention provides a method, system, computer program product, and computer readable medium for routing a communication packet through a network with multi-path capabilities without causing a broadcast storm and without employing STP, MST protocol and without manual route configuration.

According to one embodiment of the present invention, there is provided a method for routing a communication packet through a network switch device, the network switch device including at least one routing table and a plurality of switch ports, the method comprising:

receiving a communication packet having a source address s and a destination address d at a switch port p;

determining whether a valid routing table entry (s, p) exists in the at least one routing table;

determining, for the destination address d, whether there is a switch port q for which a valid routing table entry (d, q) exists in the at least one routing table; and     routing the communication packet to the switch port q, if the valid routing table entries (s, p) and (d, q) exist in the at least one routing table.

In a further embodiment, if no valid routing table entry (s, p) exists, the method further comprises:

creating a valid routing table entry (s, p) to indicate that the source address s is reachable via the switch port p; and     broadcasting the communication packet to all switch ports except the switch port p.

In a further embodiment, the method further comprises:

marking a switch port of the plurality of switch ports, through which the source address s is reachable, as a primary port with respect to the source address s.

According to another embodiment of the present invention, there is provided a system for routing a communication packet through a network switch device, the network switch device including at least one routing table and a plurality of switch ports, the system comprising:

means for receiving a communication packet having a source address s and a destination address d at a switch port p;

means for determining whether a valid routing table entry (s, p) exists in the at least one routing table;

means for determining, for the destination address d, whether there is a switch port q for which a valid routing table entry (d, q) exists in the at least one routing table; and     means for routing the communication packet to the switch port q, if the valid routing table entries (s, p) and (d, q) exist in the at least one routing table.

In a further embodiment, if the valid routing table entry (s, p) exists, the system further comprises:

means for determining whether the communication packet is a broadcast packet;

means for determining whether the switch port p is marked as a primary port with respect to the source address s, if the communication packet is the broadcast packet; and     means for discarding the communication packet, otherwise.

In a further embodiment, if the valid routing table entry (s, p) exists and no valid routing table entry (d, q) exists, the system further comprises:

means for determining whether the switch port p is marked as a primary port with respect to the source address s;

means for broadcasting the communication packet to all switch ports except the switch port p, if the switch port p is marked as the primary port; and     means for discarding the communication packet, otherwise.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the conception and specific embodiment as a base for designing or modifying the structures for carrying out the same purposes of the present invention and that such other features do not depart from the spirit and scope of the invention in its broadest form.

BRIEF DESCRIPTION OF THE DRAWINGS

The objects, features and advantages of the present invention will become apparent to one of ordinary skill in the art, in view of the following detailed description taken in combination with the attached drawings, in which.

DETAILED DESCRIPTION

Figure 1:
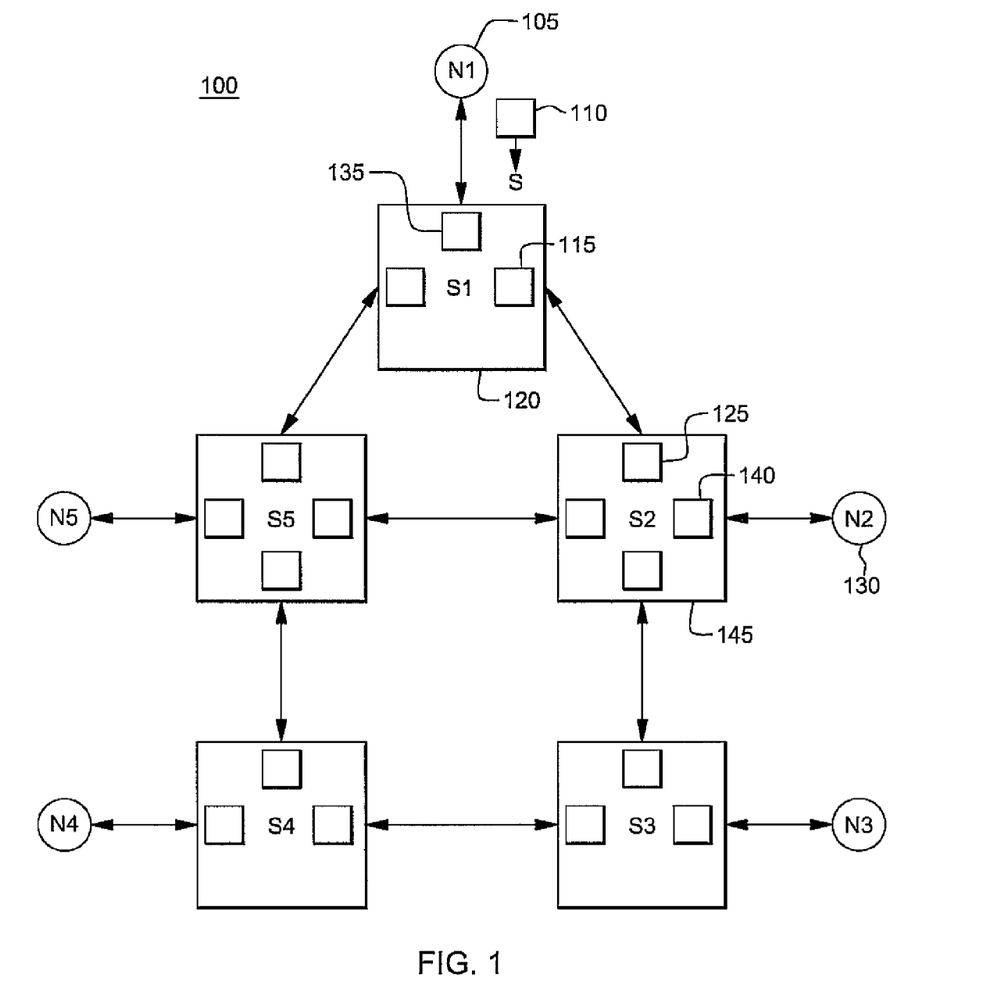
FIG. 1 illustrates a network environment operating according to one embodiment of the present invention.

FIG. 1 illustrates an exemplary network environment operating according to one embodiment of the present invention. The network environment 100 includes a plurality of nodes such as a node 1 (105) and a node 2 (130). A node may be a computing device such as a laptop, desktop, workstation, server, mainframe, netbook, etc. The network environment 100 further includes a plurality of network switch devices such as a network switch 1 (115) and a network switch 2 (125). Hickox et al. (US Patent Application Publication No. US 2008/0080543 A1), wholly incorporated by reference as set forth herein, illustrates and describes a structure or hardware configuration of a network switch device. Each node communicates with a network switch device, e.g., via sending or receiving a communication packet 110. For example, a node 1 (105) sends a communication packet 110 to another node via a network switch device 1 (120). The network switch device 1 (120) receives a communication packet 110 at a switch port 135. A node 2 (130) communicates with a network switch device 2 (145) via a switch port 140. Network switch devices also communicate with each other. For example, the network switch device 1 (120) communicates with the network switch device 2 (145) via switch ports 115 and 125.

According to one embodiment of the present invention, a network switch device includes at least one routing table and a plurality of switch ports. A routing table in the network switch device maintains mappings from MAC addresses to switch ports. To enable multi-path routing capabilities, the routing table is represented by a 2D matrix with MAC addresses along one dimension and switch ports along the other. Each routing table entry (x, y) includes a valid bit indicating a MAC address x is reachable through a switch port y. Each entry may include multiple valid bits to indicate that a MAC address is reachable through multiple switch ports.

According to this embodiment, the network switch device discovers a route as follows: When a communication packet from a MAC address src destined to a MAC address dst enters at a switch port p of the network switch device, there are at least two possible situations:

1. A routing table entry (src, p) is valid and there is at least one switch port q for which (dst, q) is valid, i.e., at least one path to dst is known. Then, the network switch device routes the communication packet via one of the at least one switch port q.

2. Either the routing table entry (src, p) is invalid or there is no switch port q for which (dst, q) is valid, i.e., either no packet from the MAC address src has previously been received at the switch port p or no path to the MAC address dst is known yet. Then, the network switch device broadcasts the communication packet to all ports except the switch port p. If the routing table entry (src, p) is invalid, the network switch device now sets the valid bit of the entry (src, p) to indicate that the MAC address src is reachable through the switch port p.

According to this embodiment, a network switch device prevents broadcast storm by checking whether (src, p) is valid. This checking ensures that a communication packet from a source node src to a switch port p of the network switch is broadcasted only once, so that the packet will not loop infinitely. For example, a corresponding flag of the routing table entry (src, p) may be initially false, and then set when the communication packet arrives at the switch port p. In other words, whenever a communication packet arrives at a switch port, the network switch device sets the corresponding flag. If the flag is false, the network switch device broadcasts the packet, and sets the flag to true. Thus, if a communication packet is routed in a loop back to a same switch port of a same network switch device, the flag will be true and the network switch device does not broadcast.

In a further embodiment, even though a path to the destination MAC address dst has not been discovered, the network switch device still can discover the path to dst while preventing the communication packet from looping. In this embodiment, the network switch device designates a switch port as a primary port of a MAC address. Primary ports form a virtual tree topology which inherently is free of loops. Thus, if the path to dst has not been discovered, the network switch device will only broadcast the communication packet if the packet arrives at the primary port. A communication packet can never arrive at a same primary port twice, because the primary ports span a tree.

In a further embodiment, each routing table entry (x, y) includes a cost metric (e.g., a hop count and time-of-flight delay etc.). The hop count indicates the number of hops (i.e., the number of network devices such as routers or gateways) between a MAC address x and a switch port y. The time-of-flight delay indicates a time that it takes for a communication packet to reach the switch port y from the MAC address x. In a further embodiment, each communication packet is tagged with a hop count. Initially, at a source node (e.g., a computing device having a network adapter having a source MAC address s), a hop count of a communication packet is zero. Each network switch device receiving the communication packet increments the hop count of the packet. When a network switch device does not have a routing table entry for the packet, the network switch device creates the entry with the hop count of the packet.

In a further embodiment, a network switch device can obtain network traffic congestion information. For example, according to IEEE standard 802.3x or IEEE draft standard 802.1Qbb, the congestion information can be conveyed by a PAUSE frame, i.e., an Ethernet frame designed to implement flow control at a MAC layer. A network switch device supporting IEEE standard 802.3x or IEEE draft standard 802.1Qbb can send the PAUSE frame to force a node to stop sending packets or data. According to IEEE draft standard 802.1Qau, the congestion information can be conveyed congestion notification frames. However, this embodiment of the present invention is not limited to operate according to the above-identified IEEE standards. This embodiment may operate according to other standard protocols or future IEEE standards.

In a further embodiment, if the network switch device detects no network traffic congestion, e.g., based on the congestion notification frames according to IEEE draft standard 802.1Qau, the network switch device routes a communication packet via a port through which there is the lowest cost metric (e.g., lowest hop count) to a destination MAC address. Thus, the network switch device optimizes routing efficiency, e.g., by selecting a shortest path to a destination MAC address when there is no congestion. When there is congestion in a path having the lowest cost metric to a destination MAC address, the network switch device routes the communication packet along with an alternative path, e.g., a path with a next lowest cost metric. A co-pending and co-assigned European Patent Application (European Patent Application Serial No. EP200951537.9, Invention Title: Overload Management in Ethernet Networks), wholly incorporated by reference as set forth herein, describes a mechanism for selecting a particular switch port based on the network traffic congestion information.

Figure 2A:
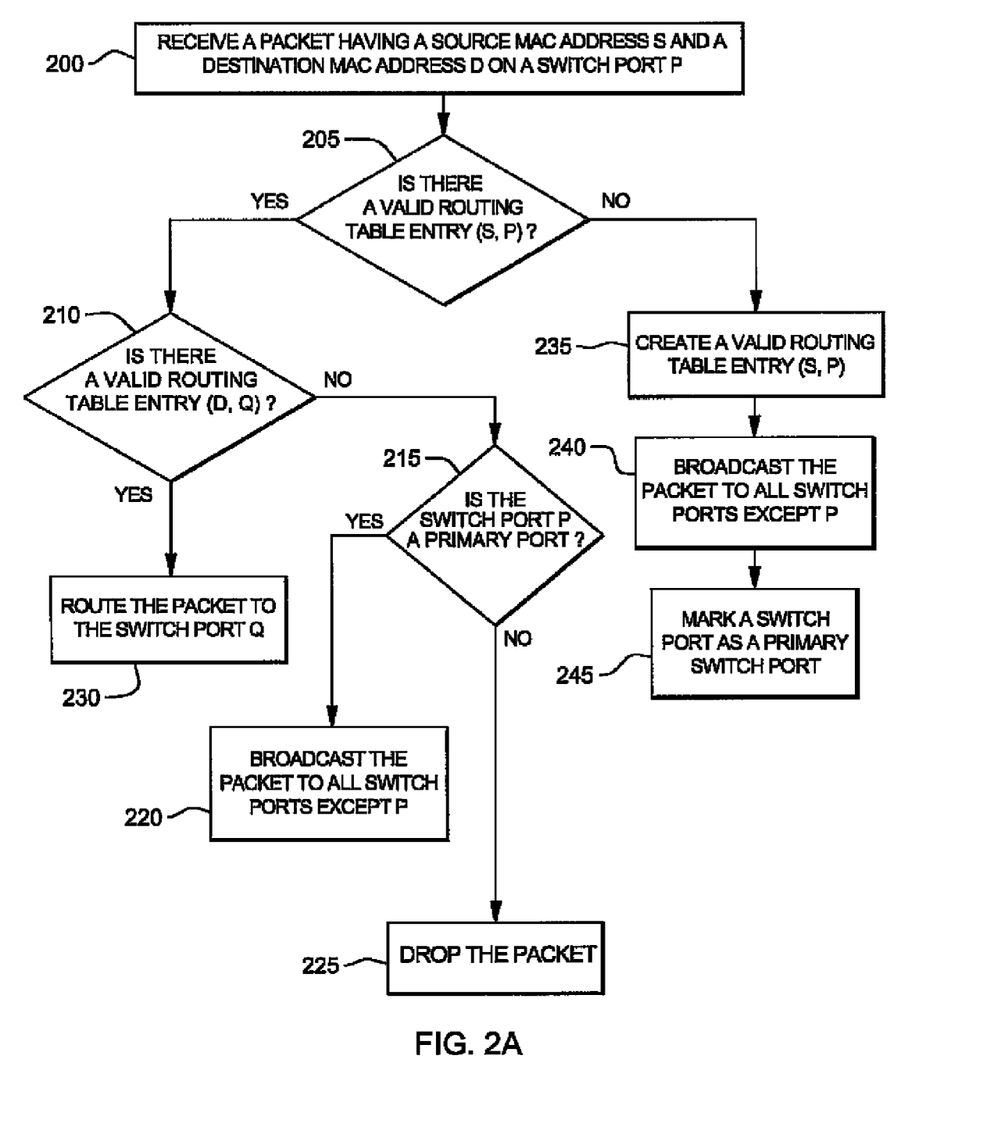
FIGS. 2*a*-2*b* illustrate flow charts describing method steps executed according to one embodiment of the present invention.
Figure 2B:
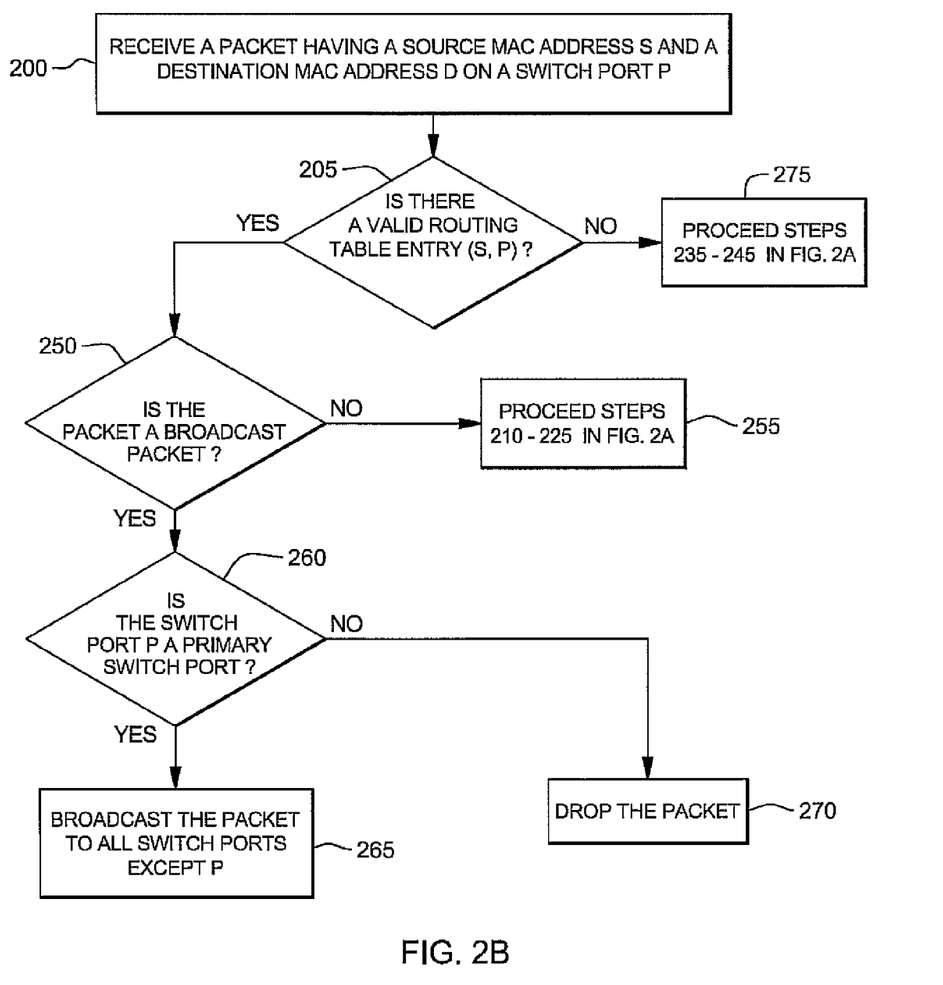

According to one embodiment of the present invention, FIGS. 2a-2b illustrates flow charts depicting a method for routing a communication packet in a network switch device by means of a routing table that maintains a mapping between MAC addresses and switch ports of the network switch device. The routing table includes entries where a valid entry (x, y) indicates that a communication packet having a destination MAC address y may be forwarded or routed to a switch port x. At step 200, the network switch device receives a communication packet having a source MAC address s and a destination address d at a switch port p.

At step 205, the network switch device determines whether there is a valid routing table entry (s, p), which indicates that the source MAC address s is reachable via the switch port p. For example, each routing table entry may include a valid bit indicating whether the entry is valid or not. If the valid bit is true, a corresponding routing table entry is valid. Otherwise, the corresponding routing table entry is invalid. If there is the valid routing table entry (s, p), at step 210, the network switch device determines, for the destination MAC address d, whether there is a switch port q for which a valid routing table entry (d, q) exists. The valid routing table entry (d, q) indicates that the destination MAC address d is reachable via the switch port q. If the valid routing table entries (s, p) and (d, q) exist in the routing table of the network switch device, at step 230, the network switch device routes the communication packet to the switch port q.

Otherwise, i.e., if there is the valid routing table entry (s, p) in the routing table and there is no valid routing table entry (d, q) in the routing table, at step 215, the network switch device evaluates whether the switch port p is marked as a primary port with respect to the source MAC address s. The primary port refers to a single switch port reachable from the source MAC address s. If multiple ports of the network switch device are reachable from the source MAC address s via different paths, the network switch device selects a switch port among the multiple ports as a primary port, e.g., by selecting a switch port at which a first packet from the source MAC address s is received. If the switch port p is marked as the primary port, at step 220, the network switch device broadcasts the communication packet to all switch ports except the switch port p. Otherwise, at step 225, the network switch devices discards the communication packet. In an alternative embodiment, primary ports could be preconfigured, for instance by using the spanning tree protocol.

Referring back to step 205, if there is no valid routing table entry (s, p) in the routing table, at step 235, the network switch device creates the valid routing table entry (s, p) to indicate that the source MAC address s is reachable via the switch port p. At step 240, the network switch device broadcasts the communication packet to all switch ports except the switch port p. At step 245, if no switch port has been marked yet as the primary port with respect to source address s, the network switch device marks one of the switch ports through which the source MAC address s is reachable as the primary port with respect to the MAC address s. Thus, no two primary ports associated with the MAC address s exist in the network switch device.

In a further embodiment, there may be additional method steps between step 205 and 210 as illustrated in FIG. 2*b*. As described above, the network switch device executes the steps 200-205. If there is the valid routing table entry (s, p), at step 250, the network switch device evaluates whether the communication packet is a broadcast packet, i.e., a packet that needs to be broadcasted to all ports except the port p. If the communication packet is the broadcast packet, at step 260, the network switch device evaluates whether the switch port p is marked as a primary port with respect to the source address. If the switch port p is marked as the primary port, at step 265, the network switch device broadcasts the communication packet to all ports except the switch port p. Otherwise, if the switch port p is not marked as the primary port, at step 270, the network switch device discards the communication packet. Returning to step 250, if the communication packet is not the broadcast packet, control proceeds at steps 210-225 in FIG. 2*a*. Returning to step 205 in FIG. 2*b*, if there is no valid routing table entry (s, p), control proceeds at steps 235-245 in FIG. 2*a*.

Figure 3:
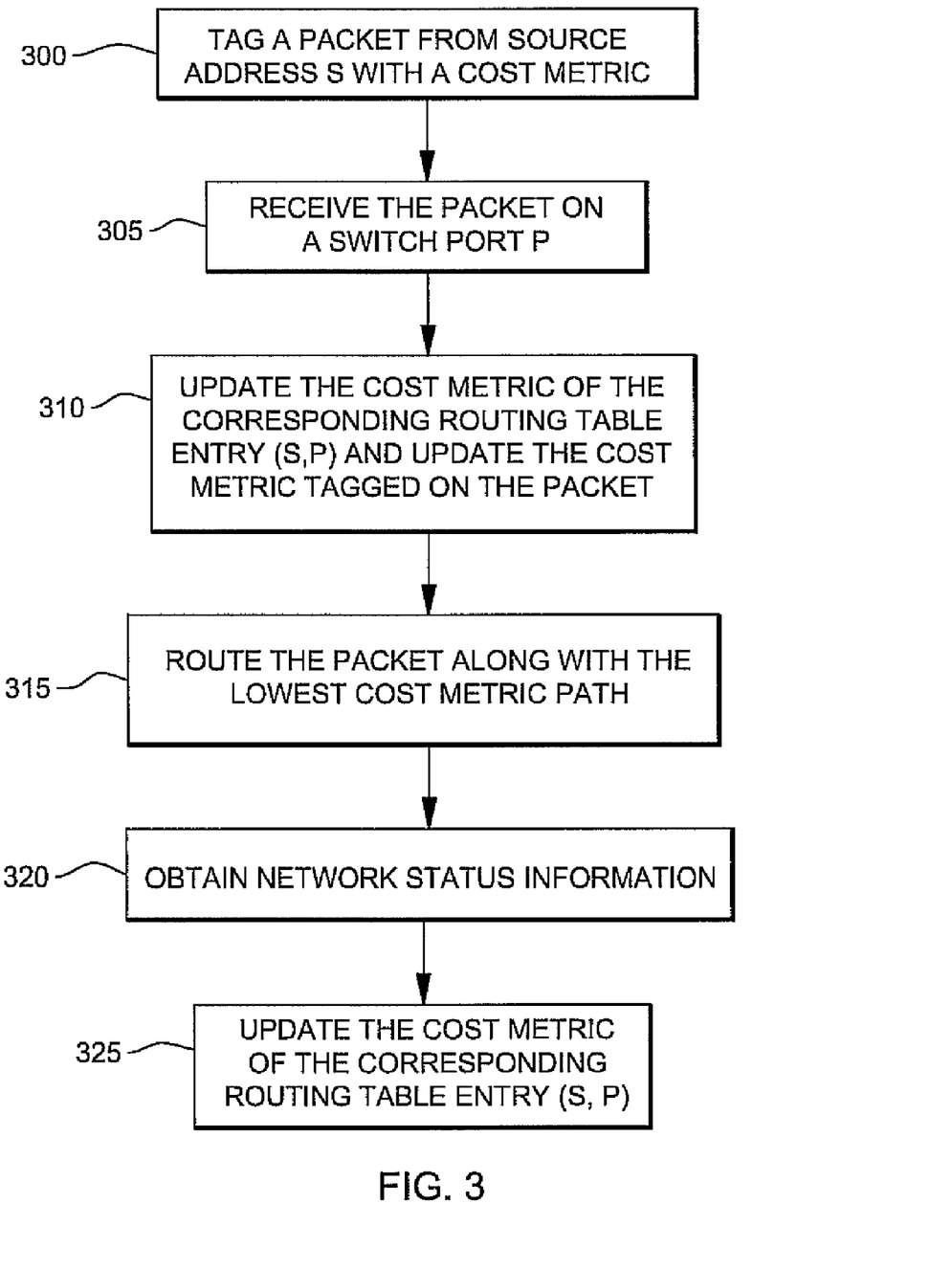
FIG. 3 illustrates another flow chart describing method steps executed according to one embodiment of the present invention.

FIG. 3 illustrates a flow chart describing method steps executed in the network switch device according to a further embodiment of the present invention. When a computing node (e.g., a node 1 (105)) creates or sends a communication packet, at step 300, the computing node tags the communication packet from a source address s with a cost metric (e.g., hop count or time-of-flight delay) indicating a path cost (e.g., the number of network devices) from a current location of the communication packet to the source MAC address s. At step 305, the network switch device receives the communication packet tagged with the cost metric at a switch port p. The valid routing table entry (d, q) further includes a cost metric indicating a path cost from the network switch to the destination MAC address d via the switch port q.

At step 310, upon receiving the communication packet tagged with the cost metric from the source MAC address s at the switch port p, the network switch device updates a cost metric of a corresponding routing table entry (s, p) according to the cost metric tagged with the communication packet. In addition, the network switch device updates the cost metric tagged with the communication packet. For example, a current hop count tagged with the communication packet may be increased by one. At step 315, the network switch device routes the communication packet having the destination MAC address d via the switch port q such that the valid routing table entry (d, q) has a cost metric lower than or equal to all other routing table entries (d, q ), where q' is a switch port other than q. Thus, network switch device routes the communication packet along with a path having the lowest cost metric.

At step 320, the network switch device obtains network status information associated with the destination MAC address d, a switch port q, or a combination of them. The network status information includes, but is not limited to: congestion information indicating a presence or absence of network congestion, an increase or decrease of network congestion or a combination of them. The network switch device may obtain the network status information, e.g., by a PAUSE frame according to IEEE Standard 802.3x or 802.1Qbb.

Then, at step 325, the network switch device updates the cost metric of the corresponding routing table entry (s, p) according to the network switch information. The network switch device also updates the cost metric of the valid routing table entry (d, q) according to the network switch information. For example, the cost metric of the valid routing table entry (d, q) increases when there is the presence or increase of the congestion. The cost metric of the table entry (d, q) decreases when there is the absence of decrease of the congestion.

Figure 4:
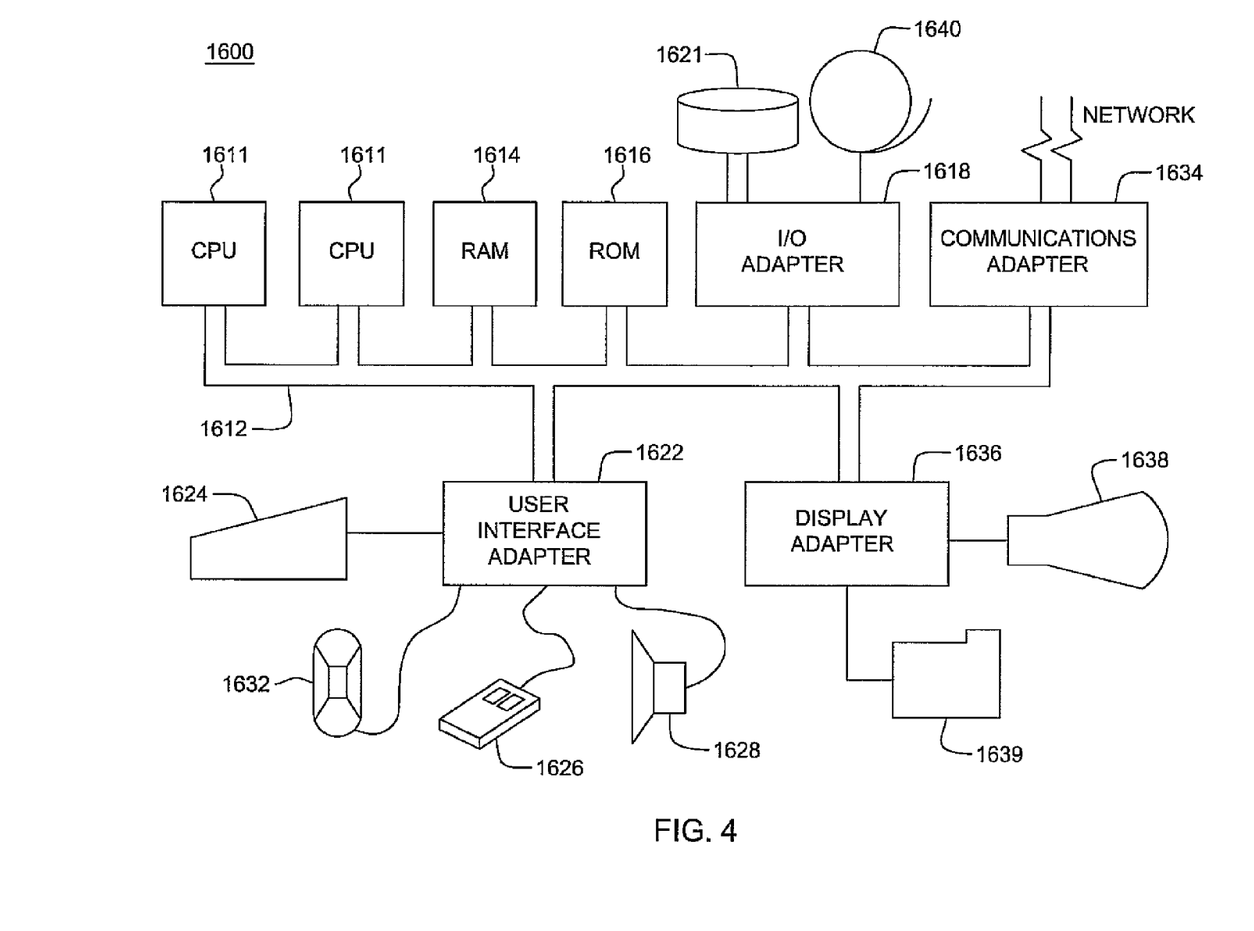
FIG. 4 illustrates an exemplary hardware configuration of a computing node according to one embodiment of the present invention.

FIG. 4 illustrates a hardware configuration of a computing node 1600 (e.g., a computing node 1 (105) in FIG. 1). The hardware configuration preferably has at least one processor or central processing unit (CPU) 1611. The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting the system 1600 to a data processing network, the Internet, an Intranet, a personal area network (PAN), etc., and a display adapter 1636 for connecting the bus 1612 to a display device 1638 and/or printer 1639 (e.g., a digital printer or the like).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) executed by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is executed by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for routing a communication packet through a network switch device, the network switch device including at least one routing table and a plurality of switch ports, the method comprising:

receiving a communication packet having a source address s and a destination address d at a switch port p;

tagging the communication packet with a cost metric, the cost metric representing a path cost from a current location of the communication packet to the source address s;

determining whether a valid routing table entry (s, p) exists in the at least one routing table;

determining, for the destination address d, whether there is a switch port q for which a valid routing table entry (d, q) exists in the at least one routing table, the valid routing table entry (d, q) including the cost metric from the network switch device to the destination address d via the switch port q;

routing the communication packet to the switch port q, if the valid routing table entries (s, p) and (d, q) exist in the at least one routing table; and routing the communication packet having the destination address d via the switch port q, the valid routing table entry (d, q) having a cost metric lower than or equal to a cost metric of all other entries (d, q') where q' is a switch port other than q.

2. The method according to claim 1, wherein if no valid routing table entry (s, p) exists, the method further comprises:

creating a valid routing table entry (s, p) to indicate that the source address s is reachable via the switch port p; and broadcasting the communication packet to all switch ports except the switch port p.

3. The method according to claim 2, further comprising:

marking a switch port of the plurality of switch ports, through which the source address s is reachable, as a primary port with respect to the source address s.

4. The method according to claim 1, further comprising: wherein if the valid routing table entry (s, p) exists, the method further comprises:

determining whether the communication packet is a broadcast packet;

determining whether the switch port p is marked as a primary port with respect to the source address s, if the communication packet is the broadcast packet;

broadcasting the communication packet to all switch ports except the switch port p if the communication packet is the broadcast packet and the switch port p is marked as a primary port with respect to the source address s; and otherwise, discarding the communication packet.

5. The method according to claim 1, wherein if the valid routing table entry (s, p) exists and no valid routing table entry (d, q) exists, the method further comprises:

determining whether the switch port p is marked as a primary port with respect to the source address s;

broadcasting the communication packet to all switch ports except the switch port p, if the switch port p is marked as the primary port; and otherwise, discarding the communication packet.

6. The method according to claim 1, wherein upon receiving the communication packet from the source address s at the switch port p, the method further comprises:

updating the cost metric of the valid routing table entry (s, p) according to the cost metric tagged on the communication packet; and updating the cost metric tagged on the communication packet.

7. The method according to claim 1, further comprising:

obtaining network status information associated with the destination address d, the switch port q, or a combination thereof; and updating the cost metric of the valid routing table entry (d, q) according to the network status information.

8. The method according to claim 7, wherein the network status information includes congestion information indicating a presence or absence of congestion, an increase or decrease of congestion or a combination thereof.

9. The method according to claim 8, wherein the cost metric of the valid routing table entry (d, q) increases when there is the presence or increase of the congestion, and the cost metric of the valid routing table entry (d, q) decreases when there is the absence or decrease of the congestion.

10. A system for routing a communication packet through a network switch device, the network switch device including at least one routing table and a plurality of switch ports, the system comprising:

a computing system including at least one memory device and at least one processor device connected to the memory device, wherein the computing system is configured to:

receive a communication packet having a source address s and a destination address d at a switch port p;

tag the communication packet with a cost metric, the cost metric representing a path cost from a current location of the communication packet to the source address s;

determine whether a valid routing table entry (s, p) exists in the at least one routing table;

determine, for the destination address d, whether there is a switch port q for which a valid routing table entry (d, q) exists in the at least one routing table, the valid routing table entry (d, q) including the cost metric from the network switch device to the destination address d via the switch port q;

route the communication packet to the switch port q, if the valid routing table entries (s, p) and (d, q) exist in the at least one routing table; and route the communication packet having the destination address d via the switch port q, the valid routing table entry (d, q) having a cost metric lower than or equal to a cost metric of all other entries (d, q') where q' is a switch port other than q.

11. The system according to claim 10, wherein if no valid routing table entry (s, p) exists, the computing system is further configured to:

create a valid routing table entry (s, p) to indicate that the source address s is reachable via the switch port p; and broadcasting broadcast the communication packet to all switch ports except the switch port p.

12. The system according to claim 11, wherein the computing system is further configured to:

mark a switch port of the plurality of switch ports, through which the source address s is reachable, as a primary port with respect to the source address s.

13. The system according to claim 10, further comprising: wherein if the valid routing table entry (s, p) exists, wherein the computing system is configured to:

determine whether the communication packet is a broadcast packet;

determine whether the switch port p is marked as a primary port with respect to the source address s, if the communication packet is the broadcast packet;

broadcast the communication packet to all switch ports except the switch port p if the communication packet is the broadcast packet and the switch port p is marked as a primary port with respect to the source address s discard the communication packet, otherwise.

14. The system according to claim 10, wherein if the valid routing table entry (s, p) exists and no valid routing table entry (d, q) exists, the computing system is further configured to:

determine whether the switch port p is marked as a primary port with respect to the source address s;

broadcast the communication packet to all switch ports except the switch port p, if the switch port p is marked as the primary port; and discard the communication packet, otherwise.

15. A non-transitory computer readable medium storing computer program instructions being executed by a processor for causing a computer to perform method steps for routing a communication packet through a network switch device, the network switch device including at least one routing table and a plurality of switch ports, said method steps comprising:

receiving a communication packet having a source address s and a destination address d at a switch port p;

tagging the communication packet with a cost metric, the cost metric representing a path cost from a current location of the communication packet to the source address s;

determining whether a valid routing table entry (s, p) exists in the at least one routing table;

determining, for the destination address d, whether there is a switch port q for which a valid routing table entry (d, q) exists in the at least one routing table, the valid routing table entry d, q) including the cost metric from the network switch device to the destination address d via the switch port q;

routing the communication packet to the switch port q, if the valid routing table entries (s, p) and (d, q) exist in the at least one routing table; and routing the communication packet having the destination address d via the switch port q, the valid routing table entry (d, q) having a cost metric lower than or equal to a cost metric of all other entries (d, q') where q' is a switch port other than q.

16. A method of deploying a computer program product including programs of instructions in a non-transitory computer readable medium for routing a communication packet through a network switch device, the network switch device including at least one routing table and a plurality of switch ports, wherein, when the programs of instructions are executed by at least one processor, the computer program product performs steps of:

receiving a communication packet having a source address s and a destination address d at a switch port p;

tagging the communication packet with a cost metric, the cost metric representing a path cost from a current location of the communication packet to the source address s;

determining whether a valid routing table entry (s, p) exists in the at least one routing table;

determining, for the destination address d, whether there is a switch port q for which a valid routing table entry (d, q) exists in the at least one routing table, the valid routing table entry (d, q) including the cost metric from the network switch device to the destination address d via the switch port q, routing the communication packet to the switch port q, if the valid routing table entries (s, p) and (d, q) exist in the at least one routing table; and routing the communication packet having the destination address d via the switch port q, the valid routing table entry (d, q) having a cost metric lower than or equal to a cost metric of all other entries (d, q') where q' is a switch port other than q.

* * * * *